(12) United States Patent
Chen et al.

(10) Patent No.: US 12,269,189 B2
(45) Date of Patent: Apr. 8, 2025

(54) CONCENTRIC-RING SINGLE-SIDED DOVETAIL GROOVE CERAMIC TILE BACK MOLD CORE AND MANUFACTURED CERAMIC TILE

(71) Applicant: HONG KONG YUXIN CERAMIC TECHNOLOGY CO., LTD, Kowloon (CN)

(72) Inventors: Rui Chen, Zhongshan (CN); Guo Chen, Zhongshan (CN)

( * ) Notice: Subject to any disclaimer, the term of this patent is extended or adjusted under 35 U.S.C. 154(b) by 225 days.

(21) Appl. No.: 17/923,207

(22) PCT Filed: Aug. 11, 2021

(86) PCT No.: PCT/CN2021/112040
§ 371 (c)(1),
(2) Date: Nov. 3, 2022

(87) PCT Pub. No.: WO2022/062746
PCT Pub. Date: Mar. 31, 2022

(65) Prior Publication Data
US 2023/0182345 A1    Jun. 15, 2023

(30) Foreign Application Priority Data
Sep. 23, 2020    (CN) .......................... 202011012111.6

(51) Int. Cl.
*B32B 3/30*    (2006.01)
*B28B 3/02*    (2006.01)
(Continued)

(52) U.S. Cl.
CPC ................ *B28B 7/20* (2013.01); *B28B 3/024* (2013.01); *B28B 7/0082* (2013.01);
(Continued)

(58) Field of Classification Search
None
See application file for complete search history.

(56) References Cited

U.S. PATENT DOCUMENTS

2008/0098689 A1    5/2008    Metten
2018/0086023 A1    3/2018    Ikeda

FOREIGN PATENT DOCUMENTS

| CN | 2463156 | 12/2001 |
|----|---------|---------|
| CN | 1562596 | 1/2005  |

(Continued)

OTHER PUBLICATIONS

Extended European Search Report, European Application No. 21871123.2, Aug. 10, 2023.
(Continued)

*Primary Examiner* — Alexander S Thomas
(74) *Attorney, Agent, or Firm* — CAIP SERVICE; Xia Li

(57) ABSTRACT

A concentric-ring single-sided dovetail groove ceramic tile back mold core is disclosed. A vulcanized rubber of back mold core surface comprises raised patterns and recessed patterns integrally formed, pasted and covered on a back mold core iron substrate. The raised patterns are equidistantly offset outwards layer by layer with a central position of the back mold core as a center; and a side of each raised pattern close to the center is of an equiangular obtuse angle, and a side of each raised pattern far away from the center is of an acute angle with an angular equal difference gradually decreasing.

8 Claims, 6 Drawing Sheets

(51) Int. Cl.
　　　*B28B 7/00*　　　(2006.01)
　　　*B28B 7/20*　　　(2006.01)
　　　*E04F 15/08*　　　(2006.01)
(52) U.S. Cl.
　　　CPC ............ *B28B 7/0097* (2013.01); *E04F 15/08*
　　　　　　　　　(2013.01); *B32B 3/30* (2013.01)

(56) References Cited

FOREIGN PATENT DOCUMENTS

| | | |
|---|---|---|
| CN | 205148576 | 4/2016 |
| CN | 108466355 A | 8/2018 |
| CN | 207711006 | 8/2018 |
| CN | 207789266 U | 8/2018 |
| CN | 208215608 | 12/2018 |
| CN | 111421652 A | 7/2020 |
| CN | 111590732 A | 8/2020 |
| CN | 112060290 | 12/2020 |
| JP | H07127230 A | 5/1995 |

OTHER PUBLICATIONS

First Office Action, Chinese application No. 2020110121116, Jan. 20, 2021.
International Search Report and Written Opinion for PCT/CN2021/112040.
First Search Report for CN 2020110121116.

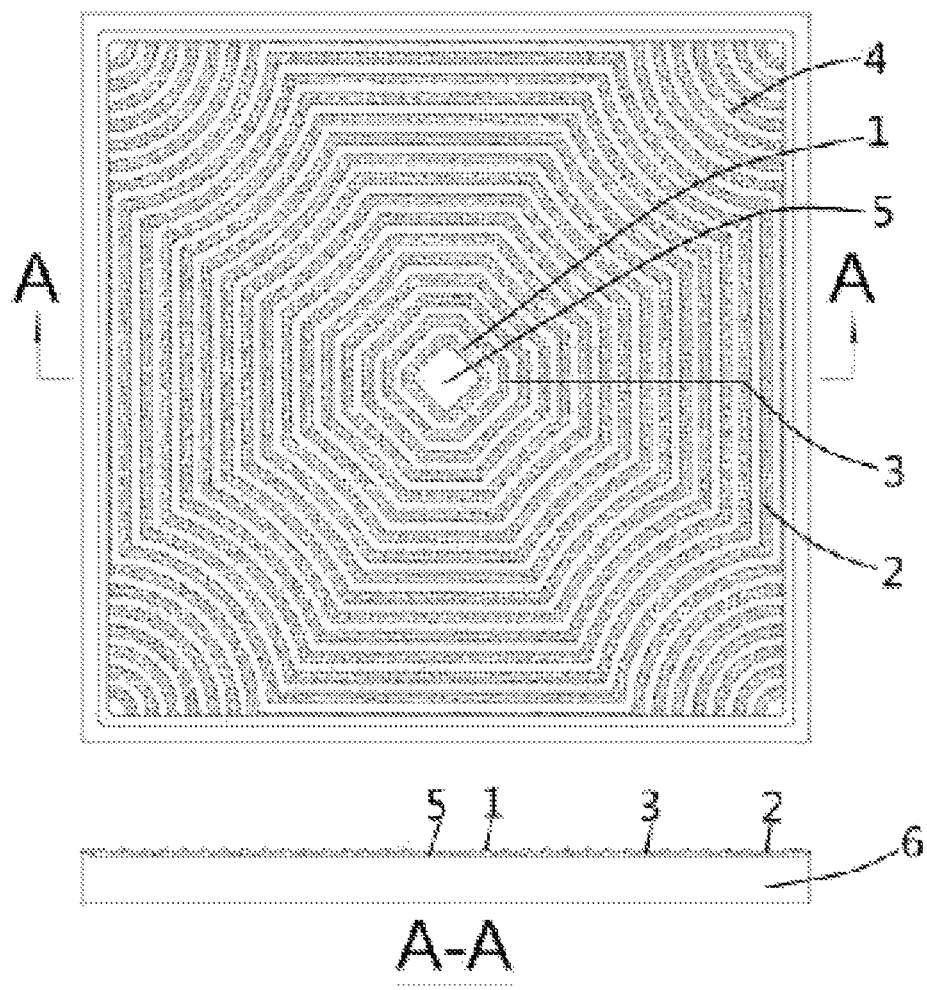
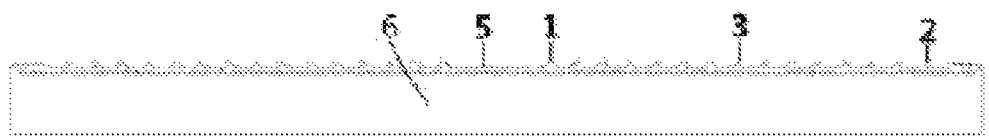
FIG. 1
FIG. 2

CONCENTRIC-RING SINGLE-SIDED DOVETAIL GROOVE CERAMIC TILE BACK MOLD CORE AND MANUFACTURED CERAMIC TILE

CROSS-REFERENCE TO RELATED APPLICATIONS

This application is a national stage filing under 35 U.S.C. § 371 of international application number PCT/CN2021/112040, filed Aug. 11, 2021, which claims priority to Chinese patent application No. 202011012111.6 filed Sep. 23, 2020. The contents of these applications are incorporated herein by reference in their entirety.

TECHNICAL FIELD

The disclosure relates to the field of ceramic production and manufacturing, in particular to a concentric-ring single-sided dovetail groove ceramic tile back mold core and a manufactured ceramic tile.

BACKGROUND

In the existing ceramic tile production process, a ceramic tile blank is formed by pressing and shaping powder with ultra-high pressure, and the ceramic tile blank is formed by clamping fixed upper and lower molds through mechanical equipment. In order to increase a bonding area, various back patterns are arranged on a back of the ceramic tile. In an existing ceramic tile back mold core process, especially in molds over 300*300 mm, most of the molds are checkered patterns, arc broom patterns, random patterns, bump patterns, and the like. All the existing back mold cores have the common point that connecting edges between the raised patterns and the recessed patterns have positive de-molding slopes, i.e., upper openings of the raised patterns are smaller than lower openings of the raised patterns, and central lines of the upper openings and the lower openings are superposed, such structure cannot lead to an effective dovetail groove.

In the process of pressing a ceramic tile blank, a thickness of the pressed blank is generally 35% to 40% of a thickness of the arranged powder, a height difference between the raised patterns and the recessed patterns on the back patterns of the ceramic tile back mold core causes a density difference in the ceramic tile blank at the corresponding positions, the ceramic tile blank with the density difference has different shrinkage rate in sintering, and thus the ceramic tile has insufficient surface smoothness, resulting in defective products of through-bottom by sintering, which makes the ceramic tile have to reduce depths of the back patterns, thus reducing the bonding strength.

In the process of pressing the ceramic tile blank, when the ceramic tile blank is pressed and formed, the ceramic tile blank is pressed by a joint force of an upper mold and a lower mold on six sides in a mold cavity. At the end of pressing, the ceramic tile blank has the same internal stress as a reaction force. In the ceramic tile blank de-molding stage, especially for the de-molding of ceramic tiles over 300*300 mm, the ceramic tile blank sandwiched by the upper mold and the lower mold floats out of a lower mold cavity first. In this case, pressure on four sides of the ceramic tile blank is released first. The ceramic tile blank expands to four sides to release the internal stress. With the further lifting of the upper mold, the whole ceramic tile blank uniformly expands to release the internal stress, and a side length of the expanded ceramic tile blank increases by about 0.5% to 1.5%. The expanded ceramic tile blank is no longer matched with the back patterns of the ceramic tile back mold core. During expansion and deformation, the ceramic tile blank slides up from the center from inside to outside along a de-molding slope position of the back patterns of the back mold core to de-mold.

SUMMARY

The disclosure aims to solve a through-bottom phenomenon of a ceramic tile by sintering during ceramic tile blank manufacturing, makes back patterns of the pressed ceramic tile be deep enough and have a dovetail groove structure, and fully utilizes the characteristic of self-expansion deformation of the ceramic tile during de-molding to provide a concentric-ring single-sided dovetail groove ceramic tile back mold core; and utilizes the concentric-ring single-sided dovetail groove ceramic tile back mold core according to the disclosure to manufacture a concentric-ring single-sided dovetail groove back pattern ceramic tile.

In order to achieve the above object, the disclosure provides the following technical solutions: a concentric-ring single-sided dovetail groove ceramic tile back mold core, comprising a back mold core iron substrate and a vulcanized rubber of back mold core surface, the vulcanized rubber of back mold core surface comprising raised patterns and recessed patterns which are integrally formed, pasted and covered on the back mold core iron substrate, wherein a first circle of raised pattern is set as a central reference ring pattern centering on a central position of the back mold core, and equidistantly offset ring raised patterns are arranged from the central reference ring pattern to an outermost circle of raised pattern, and the offset outermost circle of raised pattern is an outermost ring pattern, the ring patterns between the central reference ring pattern and the outermost ring pattern are middle ring patterns, and at four corners of the back mold core where the ring pattern cannot be formed, segmental arc patterns or straight line angle arc patterns are formed by being equidistantly offset from the outermost ring pattern; one side of all the raised patterns close to the center of the back mold core forms an obtuse angle with a back mold core plane, while the other sides of all the raised patterns far away from the center of the back mold core form an acute angle with the back mold core plane, the obtuse angles of all the raised patterns are equal, the acute angle of the central reference ring pattern is close to 90 degrees, the acute angle of the outermost ring pattern is the smallest acute angle among all the raised patterns, and the acute angles of the middle ring patterns between the central reference ring pattern and the outermost ring pattern are arranged at an interval of equal angle from the center to the outside in a descending order, and the acute angles of the angle arc patterns are equal to the acute angle of the outermost ring pattern or smaller than the acute angle of the outermost ring pattern; external corners at top portions of the raised patterns and internal corners at junctions of the raised patterns and the recessed patterns are all rounded off; and a part in the central reference ring pattern is an area of ceramic tile trademark or ceramic tile information higher than the recessed patterns.

According to the concentric-ring single-sided dovetail groove ceramic tile back mold core, a plurality of divergent rib raised patterns are provided from the central reference ring pattern to the outermost ring pattern, a height of the divergent rib raised patterns is equal to a height of the middle ring patterns, two sides of the divergent rib raised patterns form obtuse angles with the back mold core plane, and the angles are equal to the obtuse angles of the middle ring patterns.

According to the concentric-ring single-sided dovetail groove ceramic tile back mold core, a plurality of divergent divisional recessed patterns are provided from the central reference ring pattern to the outermost ring pattern, the divergent divisional recessed patterns divide patterns of the back mold core into a plurality of sectors, and divide closed rings from the central reference ring pattern to the outermost ring pattern into a plurality of independent arc patterns or straight patterns.

According to the concentric-ring single-sided dovetail groove ceramic tile back mold core, the obtuse angles of the raised patterns are from 120 degrees to 150 degrees, and the acute angles formed by each raised pattern and the back mold core plane are from 60 degrees to 89 degrees.

According to the concentric-ring single-sided dovetail groove ceramic tile back mold core, a height of the raised patterns is from 1 mm to 5 mm, a width of a root of the raised patterns is from 3 mm to 8 mm, a plane section parallel to the back mold core plane which is formed from a top portion of the raised pattern with the rounded off external corners removed is less than 1 mm, and a width of the recessed patterns between the ring patterns is from 3 mm to 10 mm.

According to the concentric-ring single-sided dovetail groove ceramic tile back mold core, heights of the raised patterns are equal or increase equidistantly outwards from the central reference ring pattern ring by ring, and an initial slope angle is less than 1 degree.

According to the concentric-ring single-sided dovetail groove ceramic tile back mold core, an isostatic pressing layer is arranged between the back mold core iron substrate and the vulcanized rubber of back mold core surface; an exhaust system is arranged between the back mold core iron substrate and the vulcanized rubber of back mold core surface, an exhaust port is located at an obtuse angle slope surface of the raised pattern, and an exhaust pipe is located in the back mold core iron substrate.

A concentric-ring single-sided dovetail groove back pattern ceramic tile is provided which can be obtained by applying the concentric-ring single-sided dovetail groove ceramic tile back mold core according to the technology of the disclosure, wherein a ceramic tile trademark or ceramic tile information is located in a central area of a back of the ceramic tile, the area is surrounded by a circle of closed recessed pattern, equidistantly offset ring recessed patterns are arranged outwards from the closed recessed pattern, slopes or arc slopes with equal angles are arranged on inner sides of all the recessed patterns close to a center of the ceramic tile, while the other sides of the recessed patterns are inclined slopes with invisible horizontal projection, angles of the inclined slopes are gradually increased from the center of the ceramic tile to the outside, and after the ceramic tile is split from a middle center line, a section of the back patterns of the fractured ceramic tile is of a zigzag shape from the middle to two sides.

The concentric-ring single-sided dovetail groove ceramic tile back mold core and the manufactured ceramic tile according to the disclosure are summarized as follows: according to the concentric-ring single-sided dovetail groove ceramic tile back mold core, the vulcanized rubber of back mold core surface comprises the raised patterns and the recessed patterns which are integrally formed, pasted and covered on the back mold core iron substrate, the raised patterns are equidistantly offset outwards layer by layer with the central position of the back mold core as the center; and the side of each raised pattern close to the center is of an equiangular obtuse angle, and the side of each raised pattern far away from the center is of an acute angle with an angular equal difference gradually decreasing. During the ceramic tile blank pressing process, the acute angles at the sides of the raised patterns far away from the center form single-sided dovetail grooves for the back pattern of the ceramic tile; and in the ceramic tile blank de-molding stage, the single-sided dovetail grooves formed on the ceramic tile blank transversely move away from the acute angles of the raised patterns by outward deformation movement when the ceramic tile blank releases self-stress, such that smooth de-molding is achieved. The concentric-ring single-sided dovetail groove back pattern ceramic tile is manufactured by using the concentric-ring single-sided dovetail groove ceramic tile back mold core of the disclosure. The ceramic tile trademark or ceramic tile information is located in the central area of the back face of the ceramic tile. After the ceramic tile is split from the middle center line, the section of the back patterns of the fractured ceramic tile is of a zigzag shape from the middle to two sides.

Compared with the existing technology, the concentric-ring single-sided dovetail groove ceramic tile back mold core and the manufactured ceramic tile according to the disclosure have the following beneficial effects as follows. The structure is simple and firm, which is obtained by the raised patterns of the concentric-ring single-sided dovetail groove which are integrally formed and covered on the back mold core iron substrate for vulcanization shaping. The isostatic pressing system and the exhaust system are added for further optimization. The manufactured ceramic tile has deep back patterns and flat surface, and the back patterns of the formed single-edge dovetail groove are symmetrical or axisymmetric, and the symmetrical patterns form a bilateral dovetail groove with excellent structural force. After being pasted, the ceramic tile forms a rigid mortise-tenon structure with an adhesive layer, which prevents the ceramic tile from falling off and greatly improves the safety performance of the ceramic tile.

BRIEF DESCRIPTION OF THE DRAWINGS

FIG. 1 is a cross-sectional view of a concentric-ring single-sided dovetail groove ceramic tile back mold core according to the disclosure.

FIG. 2 is a cross-sectional view from a center line of the concentric-ring single-sided dovetail groove ceramic tile back mold core according to the disclosure.

Figure 3:
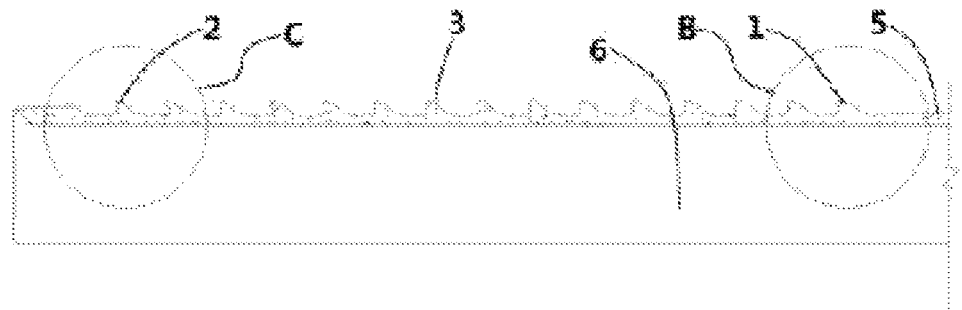
FIG. 3 is an enlarged cross-sectional view of the concentric-ring single-sided dovetail groove ceramic tile back mold core according to the disclosure.
Figure 4:
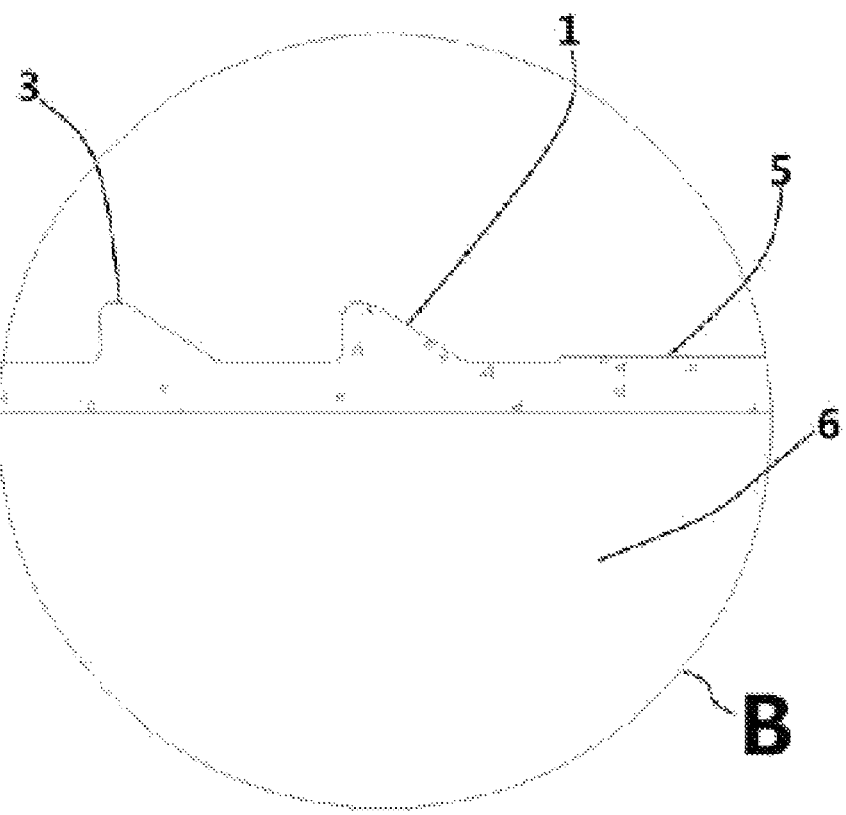
FIG. 4 is a detailed view B of a central reference ring pattern according to the disclosure.
Figure 5:
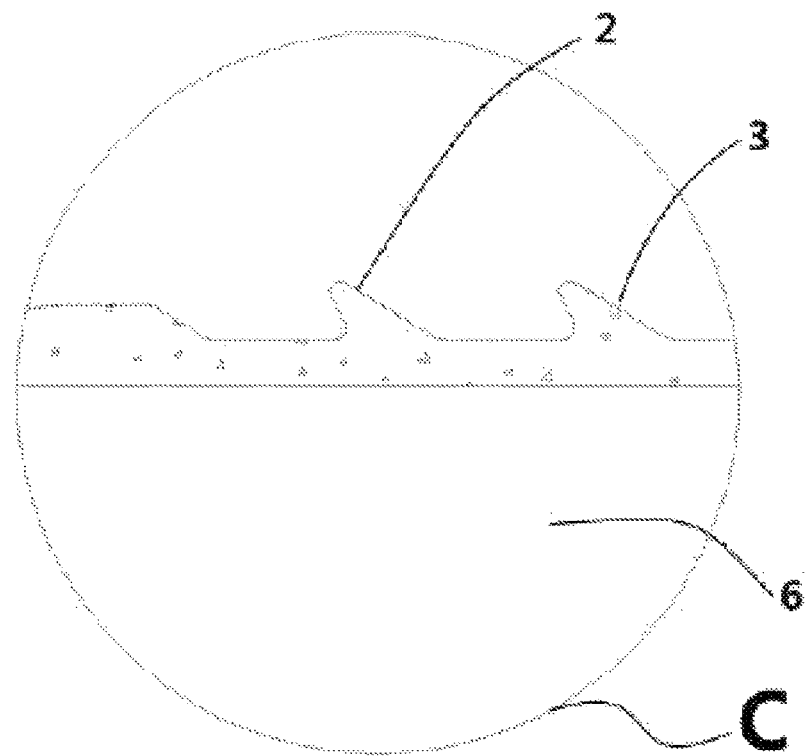
FIG. 5 is a detailed view C of an outermost ring pattern according to the disclosure.

Wherein: 1 refers to central reference ring pattern; 2 refers to outermost ring pattern; 3 refers to middle ring pattern; 4 refers to angle arc pattern; 5 refers to ceramic tile trademark or ceramic tile information; 6 refers to back mold core iron substrate; 7 refers to divergent rib raised patterns; 8 refers to divergent divisional recessed pattern; 9 refers to lower mold cavity; 10 refers to surface mold core; 11 refers to ceramic tile blank; 12 refers to exhaust system; and 13 refers to isostatic pressing layer.

DETAILED DESCRIPTION

The technical solutions of the disclosure will be described in further detail with reference to the accompanying drawings hereinafter.

As shown in FIGS. 1 to 5, and FIG. 10, a concentric-ring single-sided dovetail groove ceramic tile back mold core comprises a back mold core iron substrate 6 and a vulcanized rubber of back mold core surface. The vulcanized rubber of back mold core surface comprises raised patterns and recessed patterns which are integrally formed, pasted and covered on the back mold core iron substrate 6, wherein a first circle of raised pattern is set as a central reference ring pattern 1 centering on a central position of the back mold core, and equidistantly offset ring raised patterns are arranged from the central reference ring pattern to an outermost circle of raised pattern, and the offset outermost circle of raised pattern is an outermost ring pattern 2, the ring patterns between the central reference ring pattern 1 and the outermost ring pattern 2 are middle ring patterns 3, and at four corners of the back mold core where the ring pattern cannot be formed, segmental arc patterns or straight line angle arc patterns 4 are formed by being equidistantly offset from the outermost ring pattern 2. One side of all the raised patterns close to the center of the back mold core forms an obtuse angle with a back mold core plane, while the other sides of all the raised patterns far away from the center of the back mold core form an acute angle with the back mold core plane, the obtuse angles of all the raised patterns are equal, the acute angle of the central reference ring pattern 1 is close to 90 degrees, the acute angle of the outermost ring pattern 2 is the smallest acute angle among all the raised patterns, and the acute angles of the middle ring patterns 3 between the central reference ring pattern 1 and the outermost ring pattern 2 are arranged at an interval of equal angle from the center to the outside in a descending order, and the acute angles of the angle arc patterns 4 are equal to the acute angle of the outermost ring pattern 2 or smaller than the acute angle of the outermost ring pattern 2. External corners at top portions of the raised patterns and internal corners at junctions of the raised patterns and the recessed patterns are all rounded off. A part in the central reference ring pattern 1 is an area of ceramic tile trademark or ceramic tile information 5 higher than the recessed patterns.

Processing and manufacturing of a concentric-ring single-sided dovetail groove ceramic tile back mold core comprise preparing a back mold core iron substrate 6 and a vulcanized rubber of back mold core surface. Firstly, according to designed back patterns and shape of the concentric-ring single-sided dovetail groove ceramic tile back mold core, the same raised patterns are carved on an aluminum plate by a numerical control machine, a peripheral side length of the aluminum plate is 4 mm larger than the designed back mold core, and the finished aluminum mold is called a master mold I. Another iron plate or aluminum plate with a peripheral side length 2 mm smaller than that of the master mold I is prepared, a cutting edge of about 1.3 mm is left around the plate, and then a groove with a depth of 2 mm to 6 mm is milled on a front face of the plate. The groove is subjected to sandblasted, coated with primer, and poured with liquid polyurethane glue. Then, the master mold I coated with a release agent is covered. After the mold is closed to subject to heating and vulcanizing, the master mold I is de-molded to obtain a master mold II. A front surface of the back mold core iron substrate 6 is processed into an inner groove with a cutting edge in a thickness of 0.2 mm to 0.8 mm, a surface of the inner groove is sandblasted, coated with primer, and poured with liquid polyurethane glue, and then the mother mold II coated with the release agent is covered; after closing the mold, heating and vulcanizing, the mother mold II is de-molded, and a concentric ring one-sided dovetail groove ceramic tile back mold core with design requirements is obtained.

Figure 11:
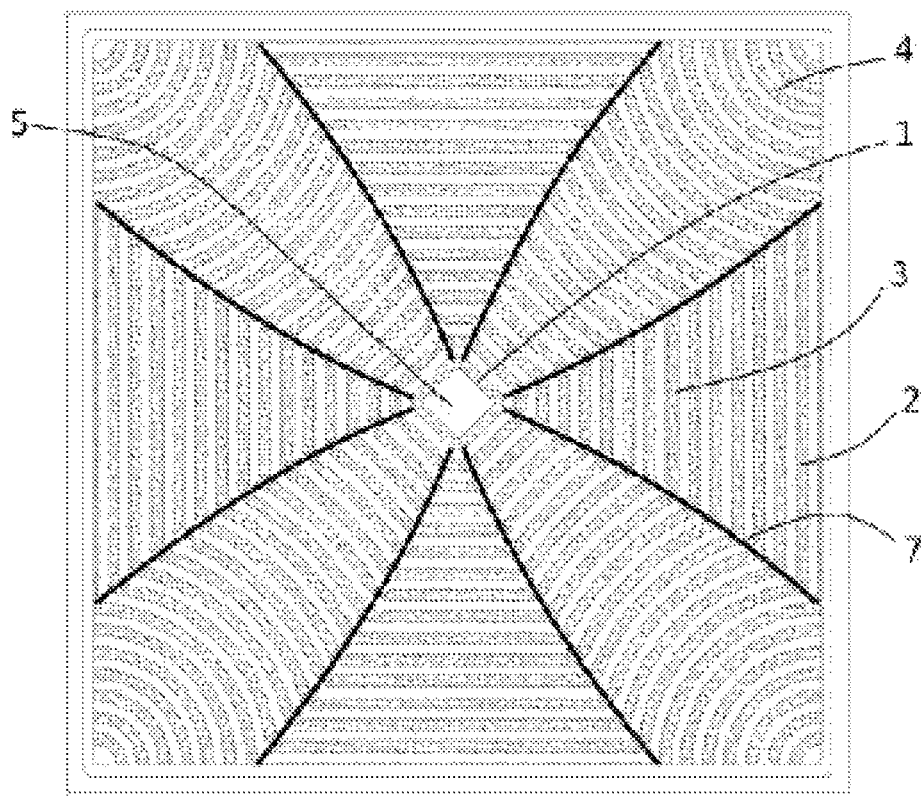
FIG. 11 is a plane view of a back mold core added with divergent rib raised patterns according to the disclosure.

As shown in FIG. 11, a reinforcing measure may be added to the concentric-ring single-sided dovetail groove ceramic tile back mold core, a plurality of divergent rib raised patterns 7 are provided from the central reference ring pattern 1 to the outermost ring pattern 2, a height of the divergent rib raised patterns 7 is equal to a height of the middle ring patterns 3, two sides of the divergent rib raised patterns form obtuse angles with the back mold core plane, and the angles are equal to the obtuse angles of the middle ring patterns 3.

Figure 12:
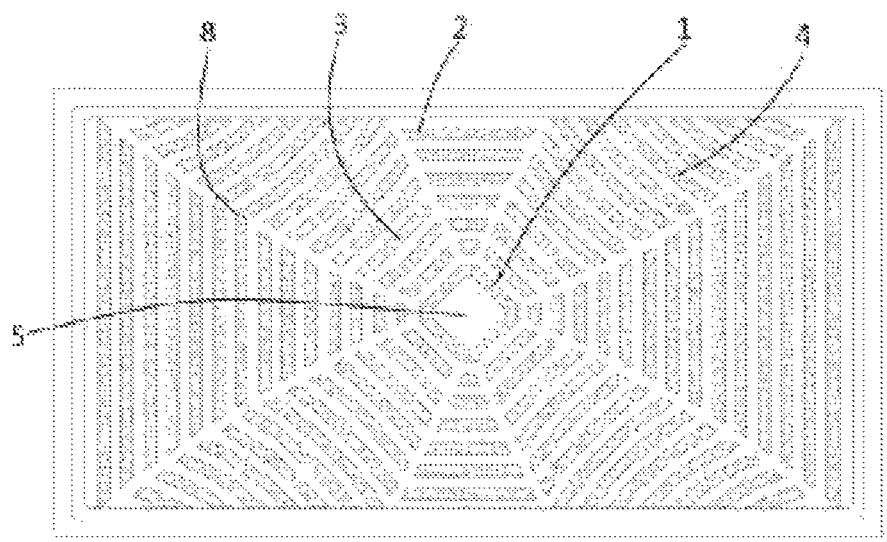
FIG. 12 is a plane view of a back mold core added with divisional recessed patterns according to the disclosure.

As shown in FIG. 12, another reinforcing measure may be added to the concentric-ring single-sided dovetail groove ceramic tile back mold core, a plurality of divergent divisional recessed patterns 8 are provided from the central reference ring pattern 1 to the outermost ring pattern 2, the divergent divisional recessed patterns 8 divide the patterns of the back mold core into a plurality of sectors, and divide the closed ring from the central reference ring pattern 1 to the outermost ring pattern 2 into a plurality of independent arc patterns or straight patterns.

As shown in FIGS. 1 to 5, and FIG. 10, in the details of the concentric-ring single-sided dovetail groove ceramic tile back mold core, one side of all the raised patterns close to the center of the back mold core forms the obtuse angle with the back mold core plane, while the other sides of all the raised patterns far away from the center of the back mold core form the acute angle with the back mold core plane, the obtuse angles of the raised patterns are from 120 degrees to 150 degrees, and the acute angles formed by each raised pattern and the back mold core plane are from 60 degrees to 89 degrees. The angles are equal and may have a deviation of 10 degrees.

As shown in FIGS. 1 to 5, and FIG. 10, in the details of the concentric-ring single-sided dovetail groove ceramic tile back mold core, a height of each of the raised patterns is from 1 mm to 5 mm, a width of a root of each of the raised patterns is from 3 mm to 8 mm, a plane section parallel to the back mold core plane which is formed from the top portion of the raised pattern with the rounded off external corners removed is less than 1 mm, and a width of each of the recessed patterns between the ring patterns is from 3 mm to 10 mm.

As shown in FIGS. 1 to 5, in the details of the concentric-ring single-sided dovetail groove ceramic tile back mold core, heights of the raised patterns are equal or increase equidistantly outwards from the central reference ring pattern ring by ring, and an initial slope angle is less than 1 degree.

Figure 9:
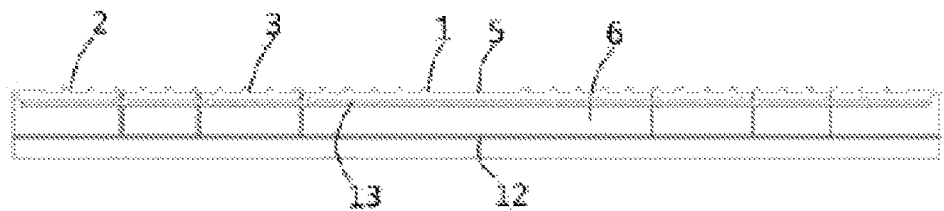
FIG. 9 is a cross-sectional view according to the disclosure when an isostatic pressing or exhaust system is added.
Figure 10:
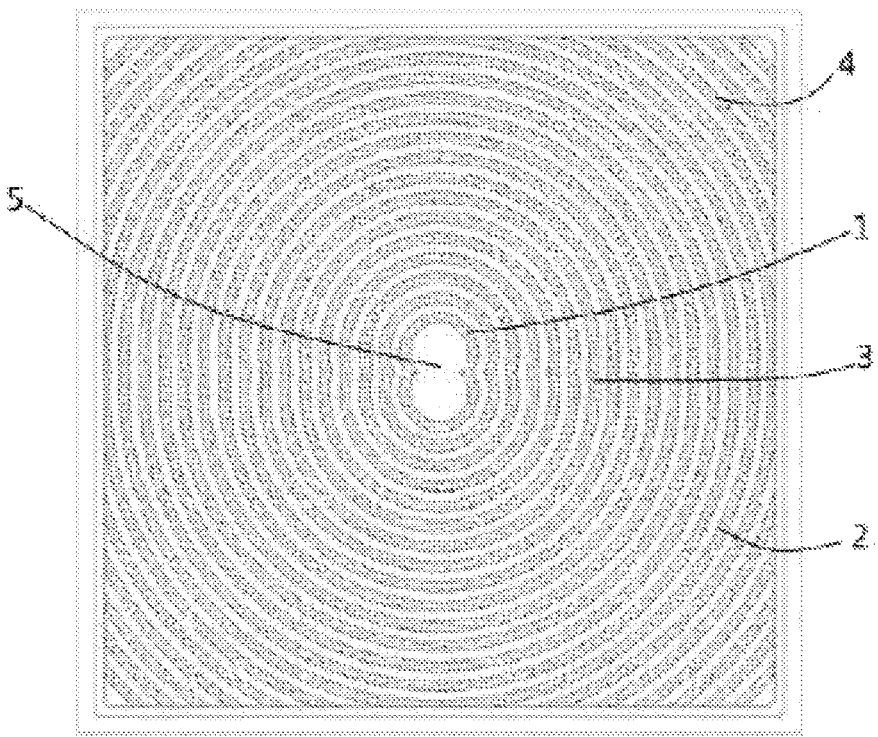
FIG. 10 is a plan view of back patterns of the concentric-ring single-sided dovetail groove ceramic tile back mold core with another pattern according to the disclosure.

As shown in FIG. 9, more optimization measures may be added to the concentric-ring single-sided dovetail groove ceramic tile back mold core, and an isostatic pressing layer 13 may arranged between the back mold core iron substrate 6 and the vulcanized rubber of back mold core surface. An exhaust system 12 may be arranged between the back mold core iron substrate 6 and the vulcanized rubber of back mold core surface, an exhaust port is located at an obtuse angle slope surface of the raised pattern, and an exhaust pipe is located in the back mold core iron substrate 6.

Figure 6:
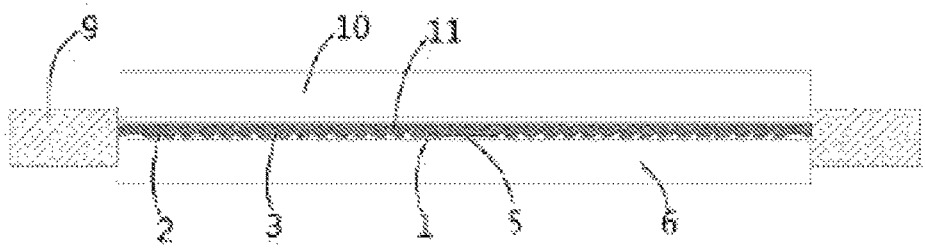
FIG. 6 is a diagram of a ceramic tile blank according to the disclosure when pressing.
Figure 7:
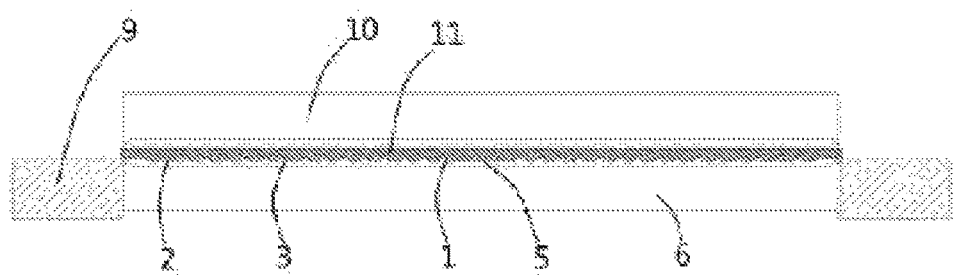
FIG. 7 is a diagram of a ceramic tile blank according to the disclosure when de-molding.
Figure 8:
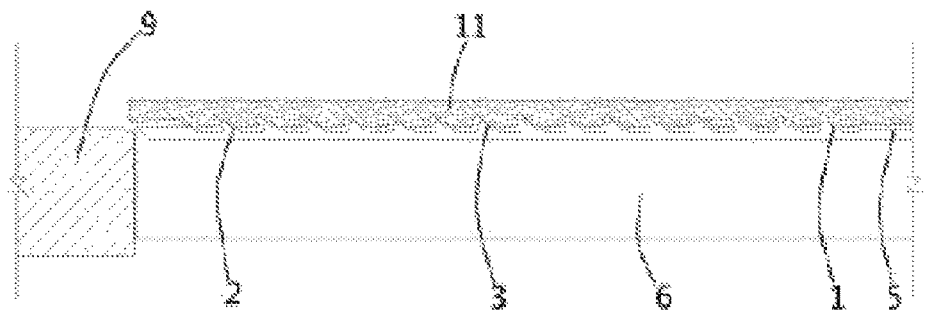
FIG. 8 is a detailed view of the ceramic tile blank according to the disclosure when de-molding.

FIG. 6, FIG. 7 and FIG. 8 show a working process and a working principle of the concentric-ring single-sided dovetail groove ceramic tile back mold core. Taking a forward punching technology with a surface mold core10 on the top as an example, before working, the concentric-ring single-sided dovetail groove ceramic tile back mold core drops to a powder feeding height in a lower mold cavity 9, and the ceramic tile powder is fed in and scraped flat. A pressing machine presses the surface mold core 10 into the lower mold cavity 9, and the ceramic tile powder is pressed to obtain a compacted ceramic tile blank 11. After the pressing is finished, the back mold core and the surface mold core 10 sandwich the ceramic tile blank 11 to rise to an upper plane of the lower mold cavity 9. In this case, the pressure constraints on the four sides of the ceramic tile blank 11 disappear, and the ceramic tile blank 11 starts to expand and deform towards the periphery to release the internal stress. With the further lifting of the surface mold core 10, the upper and lower pressure constraints disappear, and the ceramic tile blank 11 further deforms and expands to release the internal stress. In practice, the detection shows that, the side length of the ceramic tile blank 11 after fully expanding and releasing the pressure is about 0.8% longer than that of the side length in the lower cavity 9, mostly between 0.5% and 1.5%. The expansion rates of different powders and different pressure processes are different. The expansion of the ceramic tile blank 11 extends from a center of the ceramic tile blank 11 to the periphery at the same expansion rate. The expansion degree at the center of the ceramic tile blank 11 is small, and the further out the ceramic tile blank 11 is, the greater the expansion degree will be. When the ceramic tile blank 11 expands, the part in contact movement with the concentric-ring single-sided dovetail groove ceramic tile back mold core is located on one sides of the raised patterns of the back mold core near the central reference ring pattern, and the raised patterns on this side are of an obtuse angle from 120 degrees to 150 degrees. When moving transversely, the raised patterns also lift longitudinally the ceramic tile blank far away from the back mold core. The raised patterns on the other side are of an acute angle of 60 degrees to 89 degrees forming the single-edge dovetail groove, which are suspended when expanding, thus effectively protecting the single-edge dovetail groove formed by the ceramic tile blank 11.

Figure 13:
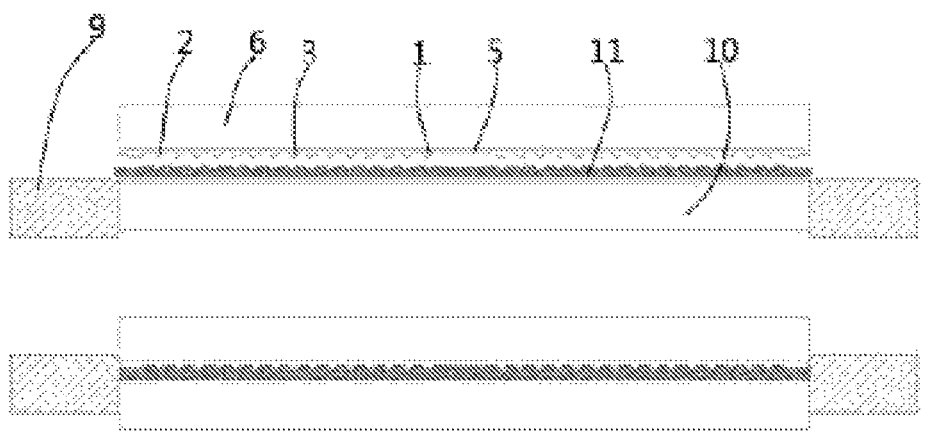
FIG. 13 is a diagram of the ceramic tile blank during pressing and de-molding of the ceramic tile in a reverse punching process according to the disclosure.

As shown in FIG. 13, the manufacturing of the concentric-ring single-sided dovetail groove ceramic tile back mold core may also use a reverse punching technology with the surface mold core 10 in the bottom, and the process is the same as the above-mentioned forward punching technology.

A concentric-ring single-sided dovetail groove back pattern ceramic tile can be obtained by applying the concentric-ring single-sided dovetail groove ceramic tile back mold core according to the technology of the disclosure, wherein a ceramic tile trademark or ceramic tile information is located in a central area of a back of the ceramic tile, the area is surrounded by a circle of closed recessed pattern, equidistantly offset ring recessed patterns are arranged outwards from the closed recessed pattern, slopes or arc slopes with equal angles are arranged on inner sides of all the recessed patterns close to a center of the ceramic tile, while the other sides of the recessed patterns are inclined slopes with invisible horizontal projection, angles of the inclined slopes are gradually increased from the center of the ceramic tile to the outside, and after the ceramic tile is split from a middle center line, a section of the back patterns of the fractured ceramic tile is of a zigzag shape from the middle to two sides.

Combining with the traditional back mold core technology of the existing ceramic tile mold, the concentric-ring single-sided dovetail groove ceramic tile back mold core according to the disclosure is especially suitable for ceramic tiles over 300*300, and may also be added with the exhaust system and the isostatic pressing layer according to the requirements of specific ceramic tiles, so as to change the back pattern characteristics of the traditional ceramic tile back mold core, make full use of the deformation movement of the ceramic tile blank when releasing the internal stress, and make the ceramic tiles be formed with the concentric-ring single-sided dovetail groove back patterns. The concentric ring is a geometric pattern with central symmetry or axial symmetry, which forms a rigid mortise-tenon structure of a rigid bilateral dovetail groove with a hardened adhesive layer, which greatly improves the safety performance of ceramic tile pasting and can produce unexpected industrial effects.

For those having ordinary skills in the art, other corresponding changes and deformations can be made according to the above technical solutions and concepts, especially the design of the central reference ring pattern, which may be circular, oval, quincunx, polygon and other symmetrical or asymmetrical patterns, or the ring patterns may be broken into segmented patterns. All these changes and deformations should be within the scope of protection of the claims of the disclosure.

The invention claimed is:

1. A concentric-ring single-sided dovetail groove ceramic tile back mold core, comprising a back mold core iron substrate and a vulcanized rubber of back mold core surface, the vulcanized rubber of back mold core surface comprising raised patterns and recessed patterns which are integrally formed, pasted and covered on the back mold core iron substrate, wherein a first circle of raised pattern is set as a central reference ring pattern centering on a central position of the back mold core, and equidistantly offset ring raised patterns are arranged from the central reference ring pattern to an outermost circle of raised pattern, and the offset outermost circle of raised pattern is an outermost ring pattern, the ring patterns between the central reference ring pattern and the outermost ring pattern are middle ring patterns, and at four corners of the back mold core where the ring pattern cannot be formed, segmental arc patterns or straight line angle arc patterns are formed by being equidistantly offset from the outermost ring pattern; one side of all the raised patterns close to the center of the back mold core forms an obtuse angle with a back mold core plane, while the other sides of all the raised patterns far away from the center of the back mold core form an acute angle with the back mold core plane, the obtuse angles of all the raised patterns are equal, the acute angle of the central reference ring pattern is close to 90 degrees, the acute angle of the outermost ring pattern is the smallest acute angle among all the raised patterns, and the acute angles of the middle ring patterns between the central reference ring pattern and the outermost ring pattern are arranged at an interval of equal angle from the center to the outside in a descending order, and the acute angles of the angle arc patterns are equal to the acute angle of the outermost ring pattern or smaller than the acute angle of the outermost ring pattern; external corners at top portions of the raised patterns and internal corners at junctions of the raised patterns and the recessed patterns are all rounded off; and a part in the central reference ring pattern is an area of ceramic tile trademark or ceramic tile information higher than the recessed patterns.

2. The concentric-ring single-sided dovetail groove ceramic tile back mold core according to claim 1, wherein a plurality of divergent rib raised patterns are provided from the central reference ring pattern to the outermost ring pattern, a height of the divergent rib raised patterns is equal to a height of the middle ring patterns, two sides of the divergent rib raised patterns form obtuse angles with the back mold core plane, and the angles are equal to the obtuse angles of the middle ring patterns.

3. The concentric-ring single-sided dovetail groove ceramic tile back mold core according to claim 1, wherein a plurality of divergent divisional recessed patterns are provided from the central reference ring pattern to the outermost ring pattern, the divergent divisional recessed patterns divide patterns of the back mold core into a plurality of sectors, and divide closed rings from the central reference ring pattern to the outermost ring pattern into a plurality of independent arc patterns or straight patterns.

4. The concentric-ring single-sided dovetail groove ceramic tile back mold core according to claim 1, wherein the obtuse angles of the raised patterns are from 120 degrees to 150 degrees, and the acute angles formed by each raised pattern and the back mold core plane are from 60 degrees to 89 degrees.

5. The concentric-ring single-sided dovetail groove ceramic tile back mold core according to claim 1, wherein a height of the raised patterns is from 1 mm to 5 mm, a width of a root of the raised patterns is from 3 mm to 8 mm, a plane section parallel to the back mold core plane which is formed from a top portion of the raised pattern with the rounded off external corners removed is less than 1 mm, and a width of the recessed patterns between the ring patterns is from 3 mm to 10 mm.

6. The concentric-ring single-sided dovetail groove ceramic tile back mold core according to claim 1, wherein heights of the raised patterns are equal or increase equidistantly outwards from the central reference ring pattern ring by ring.

7. The concentric-ring single-sided dovetail groove ceramic tile back mold core according to claim 1, wherein an isostatic pressing layer is arranged between the back mold core iron substrate and the vulcanized rubber of back mold core surface; an exhaust system is arranged between the back mold core iron substrate and the vulcanized rubber of back mold core surface, an exhaust port is located at an obtuse angle slope surface of the raised pattern, and an exhaust pipe is located in the back mold core iron substrate.

8. A concentric-ring single-sided dovetail groove back pattern ceramic tile, formed by pressing using the concentric-ring single-sided dovetail groove ceramic tile back mold core according to claim 1, wherein a ceramic tile trademark or ceramic tile information is located in a central area of a back of the ceramic tile, the area is surrounded by a circle of closed recessed pattern, equidistantly offset ring recessed patterns are arranged outwards from the closed recessed pattern, slopes or arc slopes with equal angles are arranged on inner sides of all the recessed patterns close to a center of the ceramic tile, while the other sides of the recessed patterns are inclined slopes, where angles of the inclined slopes are gradually increased from the center of the ceramic tile to the outside, and after the ceramic tile is split from a middle center line, a section of the back patterns of the fractured ceramic tile is of a zigzag shape from the middle to two sides.

* * * * *